United States Patent
Tan et al.

(10) Patent No.: US 9,185,306 B1
(45) Date of Patent: Nov. 10, 2015

(54) IMAGING MODULE AND READER FOR, AND METHOD OF, ILLUMINATING AND IMAGING TARGETS TO BE READ OVER AN EXTENDED RANGE OF WORKING DISTANCES

(71) Applicant: SYMBOL TECHNOLOGIES, INC., Schaumburg, IL (US)

(72) Inventors: Chinh Tan, Setauket, NY (US); Wynn L Aker, Manorville, NY (US); Edward D. Barkan, Miller Place, NY (US); Caihua Chen, Albany, NY (US); Wanli Chi, Stony Brook, NY (US); Mark E Drzymala, St James, NY (US); David T Shi, Setauket, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/278,413

(22) Filed: May 15, 2014

(51) Int. Cl.
| | |
|---|---|
| *G06K 7/10* | (2006.01) |
| *H04N 5/235* | (2006.01) |
| *G02B 7/02* | (2006.01) |
| *H04N 5/225* | (2006.01) |

(52) U.S. Cl.
CPC .............. *H04N 5/2354* (2013.01); *G02B 7/021* (2013.01); *H04N 5/2254* (2013.01)

(58) Field of Classification Search
CPC . G06K 7/10722; G06K 7/14; G06K 7/10881; G06K 7/0166; G06K 7/10811; G06K 7/10732
USPC ................. 235/454, 462.11, 462.17, 462.24, 235/462.41, 462.42
IPC ............. G06K 7/10722, 7/14, 7/10881, 7/0166, G06K 7/10811, 7/10732
See application file for complete search history.

(56) References Cited

U.S. PATENT DOCUMENTS

| | | | |
|---|---|---|---|
| 6,340,114 B1 | 1/2002 | Correa et al. | |
| 7,533,819 B2 | 5/2009 | Barkan et al. | |
| 2009/0236426 A1* | 9/2009 | Barkan et al. | 235/472.01 |
| 2013/0200156 A1 | 8/2013 | Kotlarsky et al. | |

FOREIGN PATENT DOCUMENTS

| | | |
|---|---|---|
| EP | 0278549 A2 | 5/1988 |
| WO | 9964980 A1 | 12/1999 |
| WO | 2010067282 A1 | 6/2010 |
| WO | 2012067956 A2 | 5/2012 |
| WO | 2013039863 A1 | 3/2013 |

OTHER PUBLICATIONS

Interntional Search Report and Written Opinion mailed Aug. 19, 2015 in counterpart PCT application PCT/US2015/030462.

* cited by examiner

*Primary Examiner* — Karl D Frech
(74) *Attorney, Agent, or Firm* — Nong-Qiang Fan

(57) ABSTRACT

Targets to be read by image capture are illuminated and imaged over an extended range of working distances. A near imager captures return light over a relatively wide imaging field of view from a target located in a close-in region of the range. A far imager captures return light over a relatively narrow imaging field of view from a target located in a far-out region of the range. A single illuminating light assembly is shared by both the near and far imagers. An illumination light source emits illumination light, and an illuminating lens assembly optically modifies the emitted illumination light, and simultaneously illuminates a wide illumination field to illuminate the target located in the close-in region of the range, and a narrow illumination field to illuminate the target located in the far-out region of the range.

20 Claims, 7 Drawing Sheets

IMAGING MODULE AND READER FOR, AND METHOD OF, ILLUMINATING AND IMAGING TARGETS TO BE READ OVER AN EXTENDED RANGE OF WORKING DISTANCES

BACKGROUND OF THE INVENTION

The present invention relates generally to an imaging module and an imaging reader for, and a method of, illuminating and imaging targets to be read over an extended range of working distances.

Solid-state imaging systems or imaging readers have been used, in both handheld and/or hands-free modes of operation, to electro-optically read targets, such as one- and two-dimensional bar code symbol targets, and/or non-symbol targets, such as documents. A handheld imaging reader includes a housing having a handle held by an operator, and an imaging module, also known as a scan engine, supported by the housing and aimed by the operator at a target during reading. The imaging module includes an imaging assembly having a solid-state imager or imaging sensor with an array of photocells or light sensors, which correspond to image elements or pixels in an imaging field of view of the imager, and an imaging lens assembly for capturing return light scattered and/or reflected from the target being imaged, and for projecting the return light onto the array to initiate capture of an image of the target. Such an imager may include a one- or two-dimensional charge coupled device (CCD) or a complementary metal oxide semiconductor (CMOS) device and associated circuits for producing and processing electronic signals corresponding to a one- or two-dimensional array of pixel data over the imaging field of view. In order to increase the amount of the return light captured by the array, for example, in dimly lit environments, the imaging module generally also includes an illuminating light assembly for illuminating the target with illumination light in an illumination pattern for reflection and scattering from the target.

In some applications, for example, in warehouses having targets on products located on high shelves, it is necessary that such targets be capable of being read by the reader at an extended range of working distances, for example, on the order of thirty to fifty feet, away from the reader. For this purpose, it is known to employ two imagers: a so-called near imager or camera to image close-in targets over a relatively wide imaging field of view, and a so-called far imager or camera to image far-out targets over a relatively narrow imaging field of view. It is also known to employ two illuminating light assemblies, each customized for each imager. For example, the illuminating light assembly for the far-out targets generally illuminates such far-out targets with more intense, brighter illumination light as compared to the illuminating light assembly for the close-in targets. It is further known to employ zoom-type or liquid crystal-based illumination mechanisms to sequentially illuminate targets at different working distances from the reader.

Although generally satisfactory for its intended purpose, the known use of two imagers and two illuminating light assemblies, as well as the known use of zoom-type or liquid crystal-based illumination mechanisms, increases the size, cost, electrical power consumption, and complexity of the imaging module, and, in turn, of the overall reader. Sequential switching between illuminating light assemblies, and zooming between working distances, can cause the illumination patterns to appear to flicker and can, in some cases, annoy the operators of the readers, as well as bother nearby bystanders or consumers. Zoom response times can be slow. Any mechanical zoom part is subject to wear and tear and can produce undesirable noise. Stray illumination light from the illuminating light assemblies may, sometimes, interfere with the operation of the imaging assembly, which can cause reading performance to deteriorate.

Accordingly, there is a need to reduce the size, cost, electrical power consumption, and complexity of the imaging module and of the overall reader, to avoid flickering illumination light patterns, to improve response times, to avoid wear and tear from moving parts, and to prevent stray illumination light from degrading reading performance.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
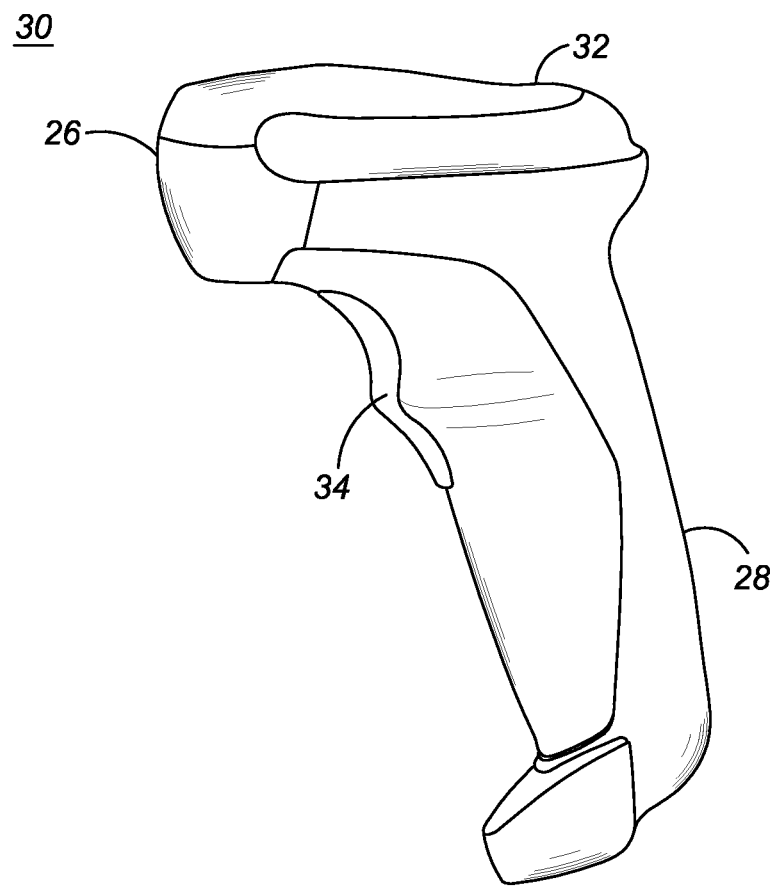
FIG. 1 is a side elevational view of a portable imaging reader operative for illuminating targets over an extended range of working distances in accordance with this invention.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to an imaging module, also known as a scan engine, for illuminating and imaging illuminated targets to be read by image capture over an extended range of working distances away from the module. Another aspect of the present disclosure relates to an imaging reader having a housing for supporting the imaging module, and a light-transmissive window on the housing. In both aspects, the imaging module comprises an imaging assembly including a plurality of solid-state imagers, each having an imaging array of image sensors, and an imaging lens assembly for capturing return light over an imaging field of view from a target, and for projecting the captured return light onto the respective imaging array. One of the imagers is a near imager or camera for capturing the return light over a relatively wide imaging field of view from a target located in a close-in region of the range. Another of the imagers is a far imager or camera for capturing the return light over a relatively narrow imaging field of view from a target located in a far-out region of the range.

The imaging module further comprises a single illuminating light assembly for shared use by both the near and far imagers. Preferably, the single illuminating light assembly is located between the near and far imagers. The single illuminating light assembly includes an illumination light source, preferably a light emitting diode (LED), for emitting illumination light, and an illuminating lens assembly for optically modifying the emitted illumination light, and for simultaneously illuminating a wide illumination field to illuminate the target located in the close-in region of the range, and a narrow illumination field to illuminate the target located in the far-out region of the range. In accordance with this disclosure, the use of a single illuminating light assembly for simultaneously generating wide and narrow illumination fields decreases the size, cost, electrical power consumption, and complexity of the imaging module, and, in turn, of the overall reader.

In a preferred construction, the LED is stationarily mounted on an optical axis, and the illuminating lens assembly includes a collimating lens that is also stationarily mounted on the optical axis, and a lenslet component including an array of lenslets that is stationarily arranged in a plane that is generally perpendicular to the optical axis. The collimating lens constitutes a convex lens or a gradient lens, either having an input surface on which the emitted illumination light is incident, and an output surface from which the modified illumination light exits as generally parallel light rays for incidence on the lenslet component. In one embodiment, a first group of the lenslets have aspheric surfaces that are configured with a first focal length to optically modify the incident light rays from the collimating lens to illuminate the target located in the close-in region with the wide illumination field, and a second group of the lenslets have aspheric surfaces that are configured with a different second focal length to optically modify the incident light rays from the collimating lens to illuminate the target located in the far-out region with the narrow illumination field. In another embodiment, all the lenslets have aspheric surfaces that are configured with the same focal length to optically modify the incident light rays from the collimating lens to illuminate the target located in the close-in region with the wide illumination field, and the lenslet component is further formed with a bypass region in which the incident light rays from the collimating lens bypass the lenslets to illuminate the target located in the far-out region with the narrow illumination field. The wide illumination field is preferably formed by the lenslets generally located at the middle region of the lenslet component, while the narrow illumination field is preferably formed by the lenslets generally located at the outer edge regions of the lenslet component.

Still another aspect of the present disclosure relates to a method of illuminating and imaging illuminated targets to be read by image capture over an extended range of working distances. The method is performed by capturing return light with a near imager over a relatively wide imaging field of view from a target located in a close-in region of the range, by capturing return light with a far imager over a relatively narrow imaging field of view from a target located in a far-out region of the range, by optically modifying illumination light emitted by a single illumination light source shared by both the near and far imagers, and by simultaneously illuminating a wide illumination field to illuminate the target located in the close-in region of the range, and a narrow illumination field to illuminate the target located in the far-out region of the range.

Reference numeral 30 in FIG. 1 generally identifies an ergonomic imaging reader configured as a gun-shaped housing having an upper barrel or body 32 and a lower handle 28 tilted rearwardly away from the body 32 at an angle of inclination, for example, fifteen degrees, relative to the vertical. A light-transmissive window 26 is located adjacent the front or nose of the body 32 and is preferably also tilted at an angle of inclination, for example, fifteen degrees, relative to the vertical. The imaging reader 30 is held in an operator's hand and used in a handheld mode in which a trigger 34 is manually depressed to initiate imaging of targets, especially bar code symbols, to be read in an extended range of working distances, for example, on the order of thirty to fifty feet, away from the window 26. Housings of other configurations, as well as readers operated in the hands-free mode, could also be employed.

Figure 2:
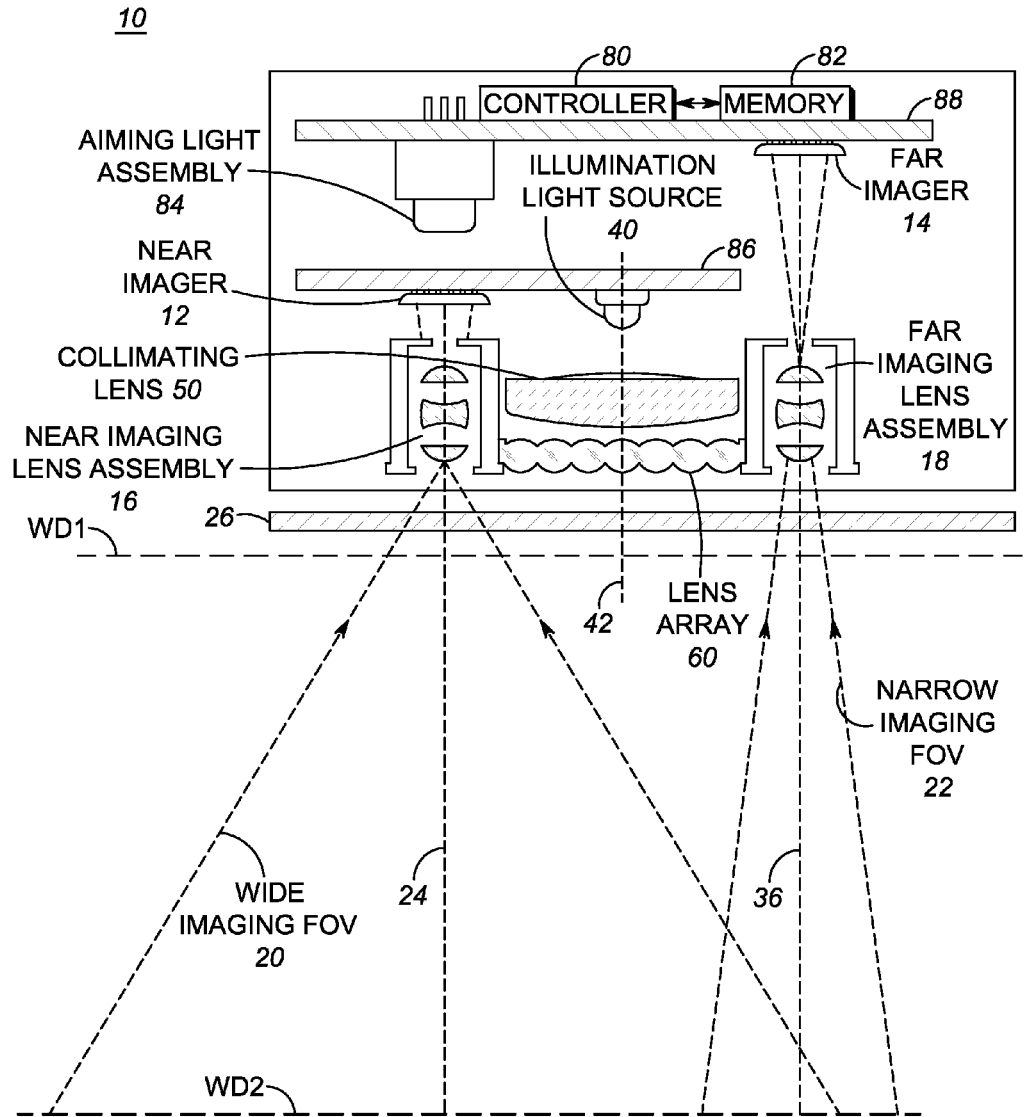
FIG. 2 is a schematic diagram of various components, including imaging and illuminating light assemblies, of the reader of FIG. 1.

As schematically shown in FIG. 2, an imaging module 10 is mounted in the reader 30 behind the window 26 and is operative, as described below, for illuminating and imaging illuminated targets to be read through the window 26 by image capture over an extended range of working distances away from the module 10. A target may be located anywhere in a working range of distances between a close-in working distance (WD1) and a far-out working distance (WD2). In a preferred embodiment, WD1 is either at, or about one-half inch away, from the window 26, and WD2 is much further away, for example, about thirty to fifty feet away from the window 26. The module 10 includes an imaging assembly that has a near imaging sensor or imager 12, and a near imaging lens assembly 16 for capturing return light over a relatively wide imaging field of view 20, e.g., about thirty degrees, from a target located in a close-in region of the range, e.g., from about one-half inch to about two feet away from the window 26, and for projecting the captured return light onto the near imager 12, as well as a far imaging sensor or imager 14, and a far imaging lens assembly 18 for capturing return light over a relatively narrow imaging field of view 22, e.g., about sixteen degrees, from a target located in a far-out region of the range, e.g., greater than about two feet away from the window 26, and for projecting the captured return light onto the far imager 14. Although only two imagers 12, 14 and two imaging lens assemblies 16, 18 have been illustrated, it will be understood that more than two can be provided in the module 10. For example, a first imager can read targets in an up-close region from about six inches to about two feet away from the window 26; a second imager can read targets in a mid-range region from about two feet to about ten feet away from the window 26; and a third imager can read targets in a far-range region from about ten feet to about fifty feet away from the window 26.

Each imager 12, 14 is a solid-state device, for example, a CCD or a CMOS imager having a one-dimensional array of addressable image sensors or pixels arranged in a single, linear row, or preferably a two-dimensional array of such sensors arranged in mutually orthogonal rows and columns, preferably with an anamorphic field of view, and operative for detecting return light captured by the respective imaging lens assemblies 16, 18 along respective imaging axes 24, 36 through the window 26. Each imaging lens assembly is advantageously a Cooke triplet, although other lens combinations can also be employed.

Figure 5:
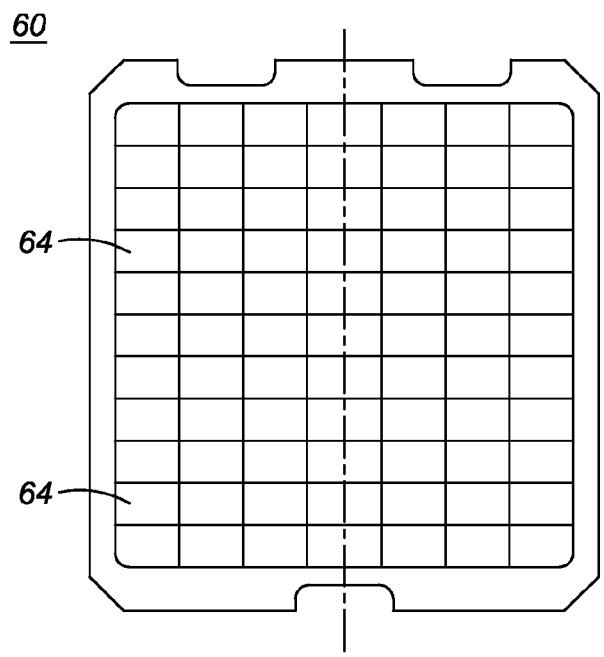
FIG. 5 is an elevational view of a lenslet array component of the illuminating light assembly of FIG. 2 in accordance with one embodiment of this invention.

As also shown in FIG. 2, an illuminating light assembly is also supported by the imaging module 10 and includes an illumination light source, e.g., a light emitting diode (LED) 40, stationarily mounted on an optical axis 42, and an illuminating lens assembly that includes a collimating convex lens 50 also stationarily mounted on the optical axis 42, and a lenslet component 60 including an array of cells or lenslets 64 (see FIGS. 5-6) stationarily arranged in a plane that is generally perpendicular to the optical axis 42. The stationary or fixed mounting of the components of the illuminating light assembly in the module 10 contrasts with known zooming mechanisms whose movable parts are subject to wear and tear, and slow response times, and produce objectionable noise.

As further shown in FIG. 2, the imagers 12, 14 and the LED 40 are operatively connected to a controller or microprocessor 80 operative for controlling the operation of these components. A memory 82 is connected and accessible to the microprocessor 80. Preferably, the microprocessor 80 is the same as the one used for processing the return light from the targets and for decoding the captured target images. In operation, the microprocessor 80 sends a command signal to energize the LED 40 for a short exposure time period, say 500 microseconds or less, and energizes and exposes the imagers 12, 14 to collect the return light, e.g., illumination light and/or ambient light, from the target only during said exposure time period. A typical array needs about 18-33 milliseconds to acquire the entire target image and operates at a frame rate of about 30-60 frames per second. An aiming light assembly 84, including a laser and a diffractive or a refractive optical element, is also energized and controlled by the microprocessor 80 in those cases where it is desired to project an aiming pattern on the target prior to reading.

As still further shown in FIG. 2, the LED 40 and the near imager 12 are surface mounted on a printed circuit board (PCB) 86, and the far imager 14, and, optionally, the microprocessor 80 the memory 82, and the aiming light assembly 84, are surface mounted on another PCB 88. The single illuminating light assembly is located between the imaging assemblies such that the illumination axis 42 is located between, and is generally parallel to, the imaging optical axes 24, 36 and achieves a highly compact configuration on the order of 38 mm×19 mm×25 mm for the module. Other physical layouts for these components are also contemplated.

Figure 3:
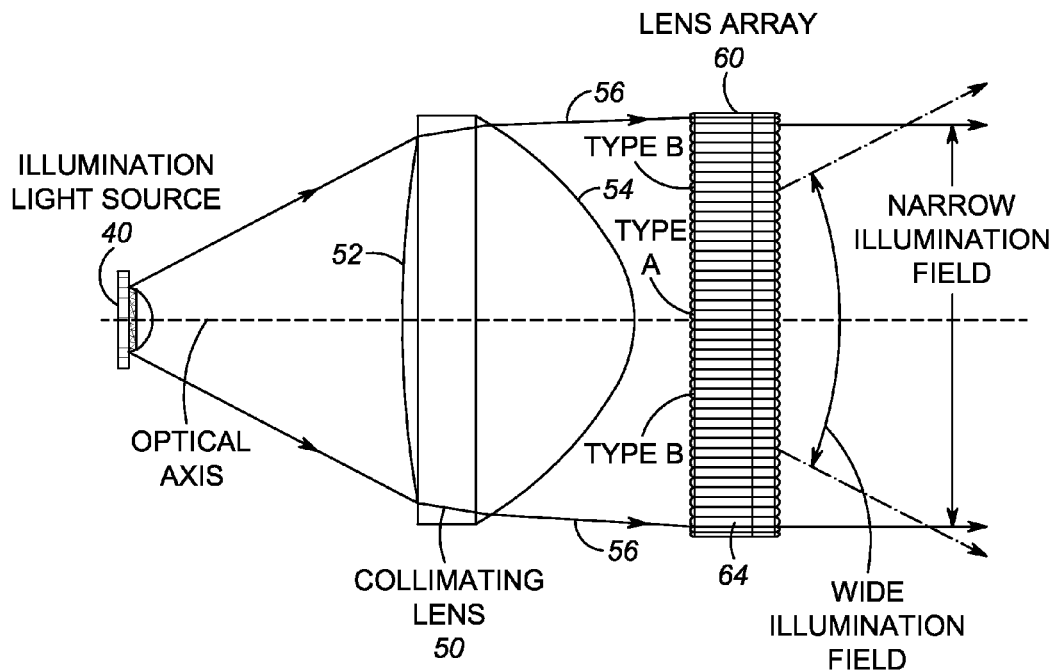
FIG. 3 is an enlarged side sectional view depicting operation of components of the illuminating light assembly of FIG. 2 in accordance with one embodiment of this invention.
Figure 4:
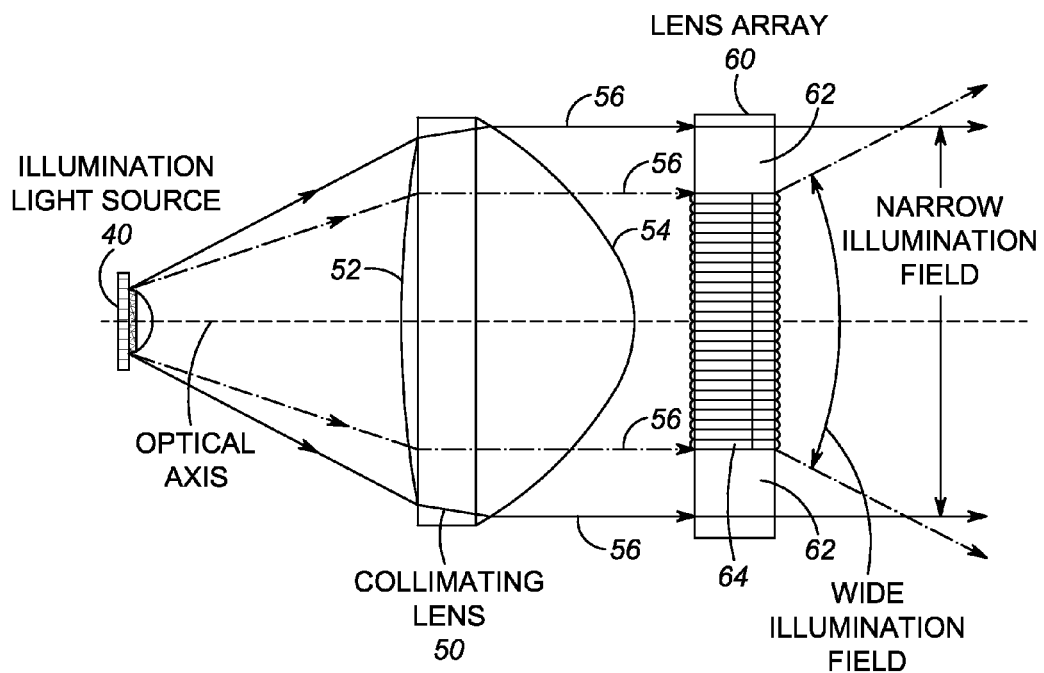
FIG. 4 is an enlarged side sectional view depicting operation of components of the illuminating light assembly of FIG. 2 in accordance with another embodiment of this invention.

FIGS. 3-4 illustrate two different embodiments of the LED 40, the collimating convex lens 50, and the lenslet component 60 of the illuminating light assembly of FIG. 2. The collimating convex lens 50 in both FIGS. 3-4 is a positive lens having an input surface 52 on which the emitted illumination light from the LED 40 is incident, and an output surface 54 from which the modified illumination light exits as generally parallel light rays 56 for incidence on the lenslet component 60. The collimating lens 50 helps to maximize on-axis gain, and is especially useful for far-range reading. The lenslets 64 of the lenslet component 50 in both FIGS. 3-4 are preferably arranged in mutually orthogonal rows and columns (see FIG. 5) and are commonly molded of a one-piece construction, preferably of a light-transmissive plastic material.

Figure 6:
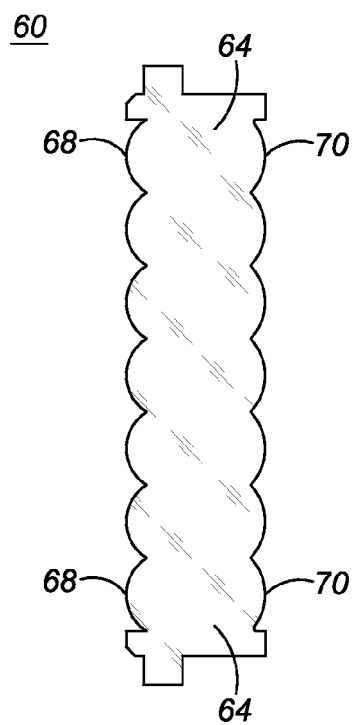
FIG. 6 is a sectional view of the lenslet array component of FIG. 5.

As best seen in FIG. 6, the lenslets 64 have individual input aspherical surfaces 68 on which the collimated illumination light rays 56 are incident, and individual output aspherical surfaces 70 for simultaneously, i.e., non-sequentially, illuminating both the wide and the narrow illumination fields. Each aspherical surface can have two radii of curvature in the horizontal and vertical directions. The size for each lenslet 64 is typically within 1×1 mm (square or rectangular) and the center thickness for each lenslet 64 is around 1.5 mm. The surfaces 68, 70 are optical quality grade surfaces with a high aspheric coefficient. The surfaces 68, 70 could be symmetric or non-symmetric about the center optical axis of each lenslet 64. The optical property of both surfaces 68, 70 and the respective center thickness determine the angular spread of the illumination field coming out from that lenslet 64.

In FIG. 3, a first group (type A) of the lenslets 64 generally located at the middle region of the lenslet component 60 are configured with a first focal length to optically modify the incident light rays 56 from the collimating lens 50 to illuminate the target located in the close-in region with the wide illumination field, and a second group (type B) of the lenslets 64 generally located at an outer peripheral annular edge region of the lenslet component 60 are configured with a different second focal length to optically modify the incident light rays 56 from the collimating lens 50 to illuminate the target located in the far-out region with the narrow illumination field.

In FIG. 4, all the lenslets 64 are configured with the same focal length to optically modify the incident light rays 56 from the collimating lens 50 to illuminate the target located in the close-in region with the wide illumination field. In addition, the lenslet component 60 has a bypass region 62 in which the incident light rays 56 from the collimating lens 50 bypass the lenslets 64 to illuminate the target located in the far-out region with the narrow illumination field. The bypass region 62 can, in its simplest form, be a light-transmissive region with no optical power. As before, the wide illumination field is preferably formed by the lenslets 64 generally located at the middle region of the lenslet component 60, while the narrow illumination field is preferably formed by the bypass region 62 generally located at the outer edge regions of the lenslet component 60.

The simultaneous, non-sequential, illumination of the wide and narrow illumination fields avoids the aforementioned flickering problem when zooming or switching between different illumination patterns in the known art. The superposition of the wide and narrow illumination fields can cause the illumination light distribution to be non-uniform across the target. If a more uniform illumination light distribution is desired, then some of the lenslets 64 may be configured with different optical properties than the remaining lenslets 64 in order to shape the illumination light distribution as desired.

Figure 7:
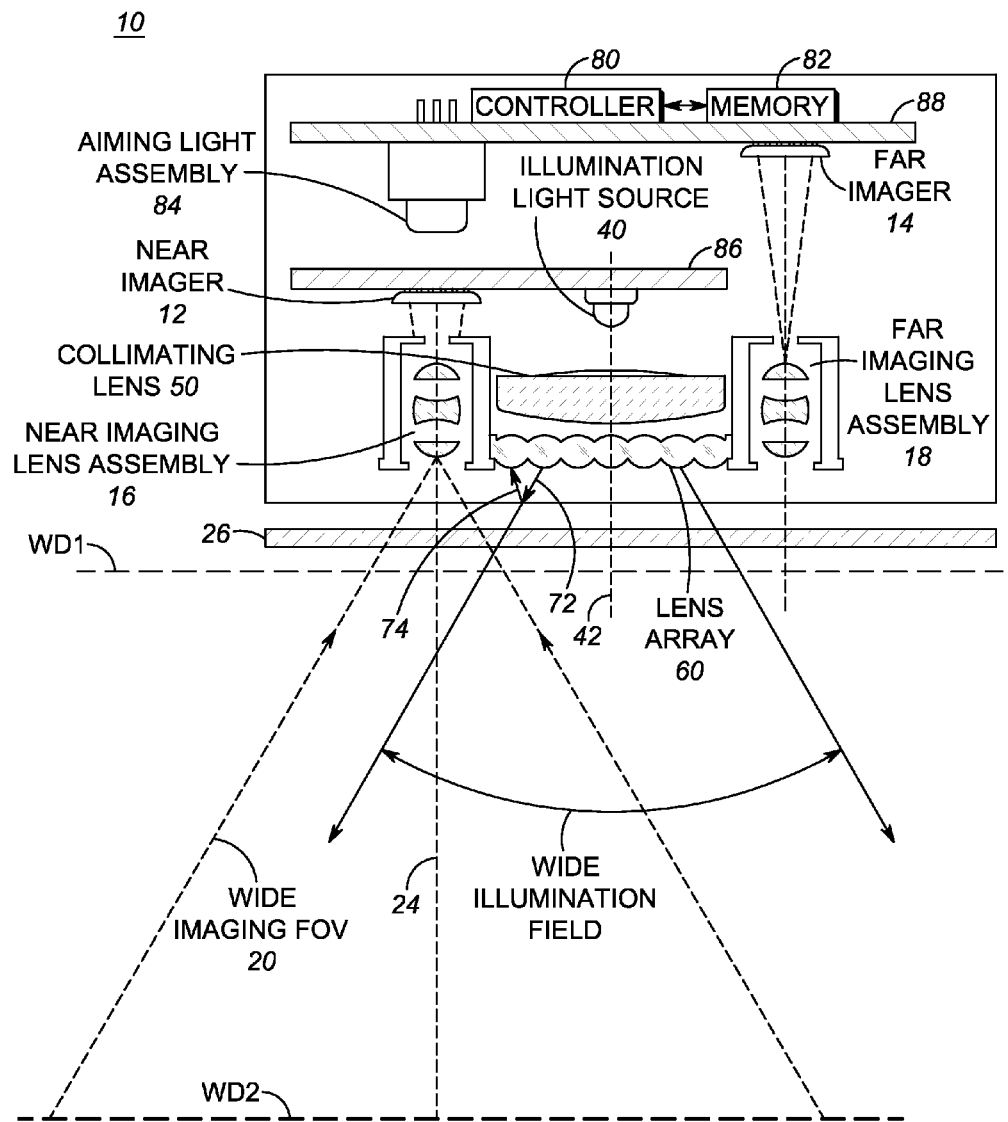
FIG. 7 is a view analogous to FIG. 2, but showing the reduction or elimination of stray illumination light from the illuminating light assembly from entering the field of view of the imaging assembly.

The location of the lenslet component 60 relative to the collimating lens 50, as well as to the window 26, can be axially and/or radially adjusted, if necessary, to avoid reflections of the illumination light back to either imager 12, 14. As shown in FIG. 7, if an illumination light ray 72 is reflected off the window 26 as a reflected ray 74, then the reflected ray 74 will not enter the wide imaging field of view 20 of the near imager 12. Thus, any stray illumination light is reliably prevented from degrading reading performance.

Figure 8:
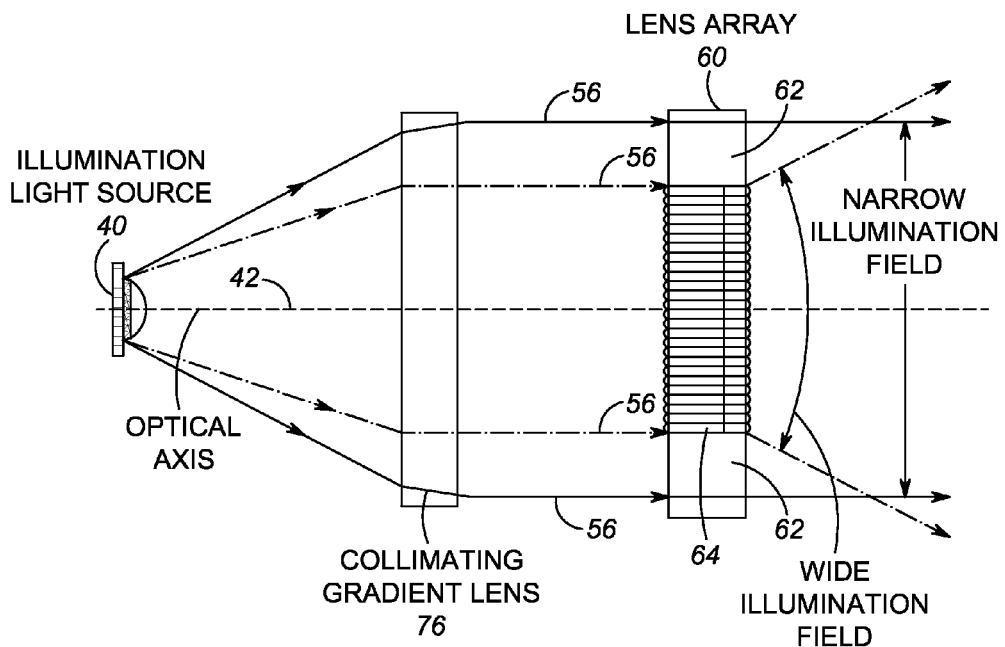
FIG. 8 is a view analogous to FIG. 4 in accordance with still another embodiment of the illuminating light assembly of this invention.

The collimating lens 50 need not be a convex lens as best illustrated in FIGS. 3-4, but could also be a gradient index lens 76 as shown in FIG. 8. In a gradient index lens, its index of refraction increases in a radial direction away from the optical axis 42. Otherwise, the embodiment of FIG. 8 is essentially the same as described above for FIG. 4.

Figure 9:
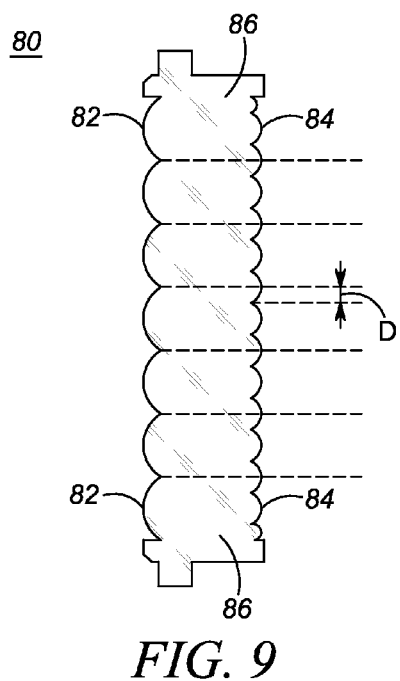
FIG. 9 is a view analogous to FIG. 4 in accordance with another embodiment of the lenslet array component of this invention.

FIG. 9 discloses another version of a lenslet component 80 having an array of lenslets 86 bounded by individual input aspherical surfaces 82 on which the collimated illumination light rays 56 are incident, and individual output aspherical surfaces 84 for simultaneously, i.e., non-sequentially, illuminating both the wide and the narrow illumination fields, as described above. However, in contrast to the lenslet component 60 of FIG. 6 wherein the surfaces 68, 70 of the lenlets 64 are mirror symmetrical, the surfaces 82, 84 of the lenlets 86 shown in FIG. 9 are not. Instead, the surfaces 84 are shifted relative to the surfaces 82.

Figure 10:
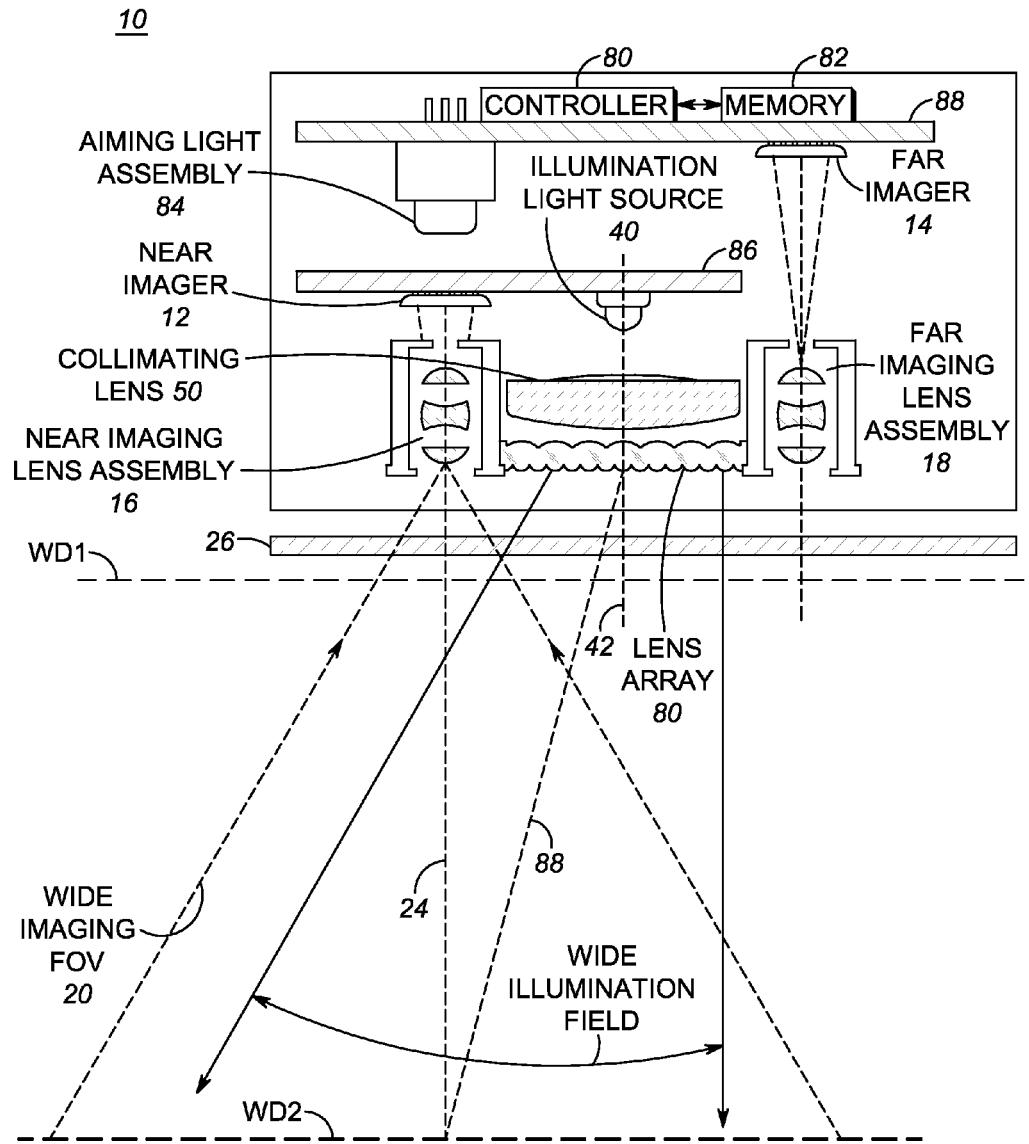
FIG. 10 is a view analogous to FIG. 2, but showing the steering of the wide illumination field to substantially overlap the wide imaging field of view of the imaging assembly.

Put another way, the vertices between adjacent surfaces 82 are not aligned with the vertices between adjacent surfaces 84 and, indeed, are shifted by a distance D. This feature is used for directing the illumination light in a desired direction that is other than perpendicular relative to the window 26, and is especially desirable to reduce the parallax between the wide illumination field and the near imager when reading targets located in the close-in region where the parallax effect is more prominent. This is shown in FIG. 10, wherein the lenslet component 80 directs the illumination light along a steering axis 88, which is inclined relative to the optical axis 42. The wide illumination field substantially overlaps the wide imaging field of view 20 of the near imager 12.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An imaging module for illuminating and imaging illuminated targets to be read by image capture over an extended range of working distances away from the module, comprising:

an imaging assembly including a plurality of solid-state imagers, each having an imaging array of image sensors, and an imaging lens assembly for capturing return light over an imaging field of view from a target, and for projecting the captured return light onto the respective imaging array, one of the imagers being a near imager for capturing the return light over a relatively wide imaging field of view from a target located in a close-in region of the range, and another of the imagers being a far imager for capturing the return light over a relatively narrow imaging field of view from a target located in a far-out region of the range; and a single illuminating light assembly for shared use by both the near and far imagers, the single illuminating light assembly including an illumination light source for emitting illumination light, and an illuminating lens assembly for optically modifying the emitted illumination light, and for simultaneously illuminating a wide illumination field to illuminate the target located in the close-in region of the range, and a narrow illumination field to illuminate the target located in the far-out region of the range.

2. The module of claim 1, wherein the illumination light source constitutes a light emitting diode stationarily mounted on an optical axis; and wherein the illuminating lens assembly includes a collimating lens stationarily mounted on the optical axis, and a lenslet component including an array of lenslets stationarily arranged in a plane that is generally perpendicular to the optical axis.

3. The module of claim 2, wherein the collimating lens constitutes at least one of a convex lens and a gradient index lens having an input surface on which the emitted illumination light is incident, and an output surface from which the modified illumination light exits as generally parallel light rays for incidence on the lenslet component.

4. The module of claim 3, wherein a first group of the lenslets generally located at a middle region of the lenslet component are configured with a first focal length to optically modify the incident light rays from the collimating lens to illuminate the target located in the close-in region with the wide illumination field, and wherein a second group of the lenslets generally located at an outer region of the lenslet component are configured with a different second focal length to optically modify the incident light rays from the collimating lens to illuminate the target located in the far-out region with the narrow illumination field.

5. The module of claim 3, wherein all the lenslets generally located at a middle region of the lenslet component are configured with the same focal length to optically modify the incident light rays from the collimating lens to illuminate the target located in the close-in region with the wide illumination field, and wherein the lenslet component has a bypass region generally located at an outer region of the lenslet component in which the incident light rays from the collimating lens bypass the lenslets to illuminate the target located in the far-out region with the narrow illumination field.

6. The module of claim 2, wherein the lenslets have individual input aspherical surfaces on which the collimated illumination light is incident, and individual output aspherical surfaces for forming the respective illumination field.

7. The module of claim 6, wherein the output aspherical surfaces are shifted relative to the input aspherical surfaces to steer the wide illumination field toward the wide imaging field of view.

8. The module of claim 2, wherein some of the lenslets have different optical properties than the remaining lenslets to form the illumination fields with a generally uniform light intensity distribution.

9. An imaging reader for reading targets by image capture over an extended range of working distances, comprising:

a housing having a light-transmissive window; and an imaging module supported by the housing and operative for illuminating and imaging the targets, the module having an imaging assembly including a plurality of solid-state imagers, each having an imaging array of image sensors, and an imaging lens assembly for capturing return light through the window over an imaging field of view from a target, and for projecting the captured return light onto the respective imaging array, one of the imagers being a near imager for capturing the return light through the window over a relatively wide imaging field of view from a target located in a close-in region of the range, and another of the imagers being a far imager for capturing the return light through the window over a relatively narrow imaging field of view from a target located in a far-out region of the range, and a single illuminating light assembly for shared use by both the near and far imagers, the single illuminating light assembly including an illumination light source for emitting illumination light through the window, and an illuminating lens assembly for optically modifying the emitted illumination light, and for simultaneously illuminating a wide illumination field to illuminate the target located in the close-in region of the range, and a narrow illumination field to illuminate the target located in the far-out region of the range.

10. The reader of claim 9, wherein the illumination light source constitutes a light emitting diode stationarily mounted on an optical axis; and wherein the illuminating lens assembly includes a collimating lens stationarily mounted on the optical axis, and a lenslet component including an array of lenslets stationarily arranged in a plane that is generally perpendicular to the optical axis.

11. The reader of claim 10, wherein the collimating lens constitutes at least one of a convex lens and a gradient index lens having an input surface on which the emitted illumination light is incident, and an output surface from which the modified illumination light exits as generally parallel light rays for incidence on the lenslet component.

12. The reader of claim 11, wherein a first group of the lenslets generally located at a middle region of the lenslet component are configured with a first focal length to optically modify the incident light rays from the collimating lens to illuminate the target located in the close-in region with the wide illumination field, and wherein a second group of the lenslets generally located at an outer region of the lenslet component are configured with a different second focal length to optically modify the incident light rays from the collimating lens to illuminate the target located in the far-out region with the narrow illumination field.

13. The reader of claim 11, wherein all the lenslets generally located at a middle region of the lenslet component are configured with the same focal length to optically modify the incident light rays from the collimating lens to illuminate the target located in the close-in region with the wide illumination field, and wherein the lenslet component has a bypass region generally located at an outer region of the lenslet component in which the incident light rays from the collimating lens bypass the lenslets to illuminate the target located in the far-out region with the narrow illumination field.

14. The reader of claim 10, wherein the lenslets have individual input aspherical surfaces on which the collimated illumination light is incident, and individual output aspherical surfaces for forming the respective illumination field; and wherein the output aspherical surfaces are shifted relative to the input aspherical surfaces to steer the wide illumination field toward the wide imaging field of view.

15. The reader of claim 10, wherein some of the lenslets have different optical properties than the remaining lenslets to form the illumination fields with a generally uniform light intensity distribution.

16. The reader of claim 9, wherein the single illuminating light assembly is located between the plurality of imagers, and wherein at least one component of the illuminating light assembly is adjustably positioned relative to at least one of the imagers and the window to prevent stray illumination light that is reflected off the window from entering at least one of the imaging fields of view.

17. A method of illuminating and imaging illuminated targets to be read by image capture over an extended range of working distances, comprising:

capturing return light with a near imager over a relatively wide imaging field of view from a target located in a close-in region of the range;

capturing return light with a far imager over a relatively narrow imaging field of view from a target located in a far-out region of the range;

optically modifying illumination light emitted by a single illumination light source shared by both the near and far imagers; and simultaneously illuminating a wide illumination field to illuminate the target located in the close-in region of the range, and a narrow illumination field to illuminate the target located in the far-out region of the range.

18. The method of claim 17, wherein the illuminating is performed by stationarily mounting a collimating lens on an optical axis, and by stationarily arranging a lenslet component having an array of lenslets in a plane that is generally perpendicular to the optical axis; and configuring a first group of the lenslets generally located at a middle region of the lenslet component with a first focal length to optically modify light rays from the collimating lens to illuminate the target located in the close-in region with the wide illumination field; and configuring a second group of the lenslets generally located at an outer region of the lenslet component with a different second focal length to optically modify the light rays from the collimating lens to illuminate the target located in the far-out region with the narrow illumination field.

19. The method of claim 17, wherein the illuminating is performed by stationarily mounting a collimating lens on an optical axis, and by stationarily arranging a lenslet component having an array of lenslets in a plane that is generally perpendicular to the optical axis; and configuring all the lenslets generally located at a middle region of the lenslet component with the same focal length to optically modify light rays from the collimating lens to illuminate the target located in the close-in region with the wide illumination field; and configuring the lenslet component with a bypass region generally located at an outer region of the lenslet component in which the light rays from the collimating lens bypass the lenslets to illuminate the target located in the far-out region with the narrow illumination field.

20. The method of claim 17, wherein the illuminating is performed by stationarily mounting a collimating lens on an optical axis, and by stationarily arranging a lenslet component having an array of lenslets in a plane that is generally perpendicular to the optical axis; configuring some of the lenslets with different optical properties than the remaining lenslets to form the illumination fields with a generally uniform light intensity distribution.

\* \* \* \* \*